(No Model.)
W. H. WHEELER.
ANIMAL WEANER.
No. 377,794. Patented Feb. 14, 1888.
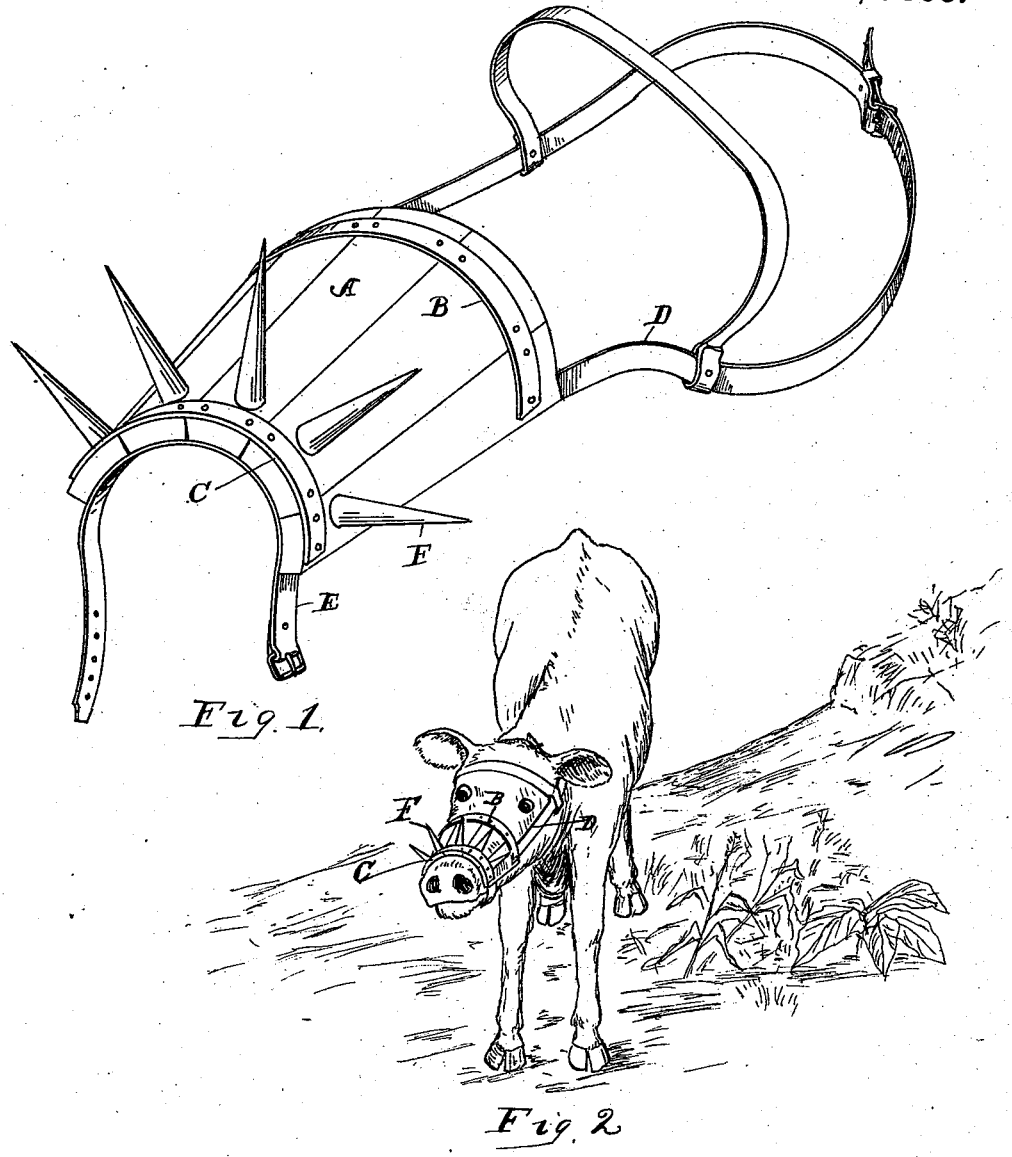
Fig. 1.
Fig. 2.
WITNESSES:
Robert Kirk.
Anna Falow.
INVENTOR:
William H. Wheeler
By 
Attorney.

UNITED STATES PATENT OFFICE.

WILLIAM H. WHEELER, OF SPIVA, MISSOURI.

ANIMAL-WEANER.

SPECIFICATION forming part of Letters Patent No. 377,794, dated February 14, 1888.

Application filed June 9, 1887. Serial No. 240,795. (No model.)

*To all whom it may concern:*

Be it known that I, WILLIAM H. WHEELER, of Spiva, in the county of Ozark and State of Missouri, have invented a new and useful Improvement in Animal-Weaners, which improvement is fully set forth in the following specification and accompanying drawings, in which—

Figure 1 is a perspective view of my improved animal-weaner, and Fig. 2 a view of the same in use.

My device relates to an improvement in animal-weaners for calves and colts; and it consists of a flexible stave section so disposed as to fit over the muzzle of the animal and secured in position by straps, each of the staves having a wooden spike at its lower end and projecting therefrom, so that they will come in contact with the udder of the cow when the calf desires to suck. The spikes are designed to be made of blunt wooden pins, so that the cow is not injured, which would be the case if they were made of iron or sharpened, all of which will now be fully set forth in detail.

Wooden staves A having beveled edges are disposed in a segmental section and jointed together by leather pieces B and C at the ends. These pieces B and C are secured in position by means of screws or tacks. This section is preferably formed somewhat cone-shaped, so as to fit on the muzzle of an animal. To the upper end of the section straps D are attached, to extend up over the head of the animal, while at the lower end are straps E, to extend around the muzzle, for securing the device in position. At the lower end of the section I provide, preferably, wooden spikes F, disposed radially to the section. These spikes are disposed within openings in the staves and secured by means of screws or small nails.

My device, as will readily be noticed, is especially designed to be applied to calves; but it is obvious that it may be applied to self-milking cows. When used in this manner, the spokes are to be made somewhat longer than otherwise.

What I claim is—

The within-described animal-weaner, consisting of the wooden staves A, having beveled edges and a wooden spike in one end, disposed in a segmental cone-shaped section, and leather pieces B and C, to which they are suitably secured, with straps at one end to fit over the animal's head and at the other to extend around the muzzle, substantially as described.

In testimony that I claim the foregoing I have hereunto set my hand, this 31st day of January, 1887, in the presence of witnesses.

WILLIAM H. WHEELER.

Witnesses:
ELMER STONE,
E. F. HYNES.